United States Patent [19]
Kohl et al.

[11] 3,741,344
[45] June 26, 1973

[54] APPARATUS FOR AUTOMATIC LUBRICATION OF VIBRATION GENERATORS

[75] Inventors: Alois Kohl; Rudolf Hartmannsgruber, both of Munich, Germany

[73] Assignee: Wacher-Werke KG, Munich, Germany

[22] Filed: Mar. 15, 1971

[21] Appl. No.: 123,955

[30] Foreign Application Priority Data

Mar. 14, 1970 Germany.........P 20 12 292.3

[52] U.S. Cl............................ 184/69, 184/6.26
[51] Int. Cl............................ F16n 7/32
[58] Field of Search............... 184/69, 6.26

[56] References Cited
UNITED STATES PATENTS

| | | | |
|---|---|---|---|
| 2,728,614 | 12/1955 | Rink | 184/69 |
| 1,980,128 | 11/1934 | Young | 184/69 |
| 176,422 | 4/1876 | Bryant | 184/69 |
| 1,309,685 | 7/1919 | Hansen | 184/69 |
| 1,662,022 | 3/1928 | Bacon | 184/69 |
| 860,819 | 7/1907 | Millett | 184/69 |
| 1,483,535 | 2/1924 | Orsdale | 184/69 |
| 2,018,286 | 10/1935 | Smith et al. | 184/69 |

Primary Examiner—Manuel A. Antonakas
Attorney—Walter Becker

[57] ABSTRACT

A method of and arrangement for automatically lubricating a vibration generator according to which the vibration of the vibration generator to be lubricated is conveyed to means in a lubricant-containing storage vessel, which means release lubricant to the area to be lubricated in conformity with the vibrations of the vibration generator.

1 Claim, 7 Drawing Figures

INVENTORS
ALOIS KOHL
RUDOLF HARTMANNSGRUBER

BY Walter Becker

TO AREA TO BE LUBRICATED

TO AREA TO BE LUBRICATED

INVENTORS
ALOIS KOHL
RUDOLF HARTMANNSGRUBER

APPARATUS FOR AUTOMATIC LUBRICATION OF VIBRATION GENERATORS

The present invention relates to a method and an apparatus for automatic lubrication of vibration generators during the operation of such vibration generators.

Various possibilities and methods are known for lubricating vibrators. One of these methods consists in that daily prior to operating the vibrator or the working device, the areas to be lubricated are, by means for instance of a grease press, provided with a certain quantity of grease. This type of lubrication, however, is disadvantageous inasmuch as if the operator forgets to lubricate the device, for instance the bearing areas become dry rather quickly with the result of an increased wear of the working device.

Another heretofore known possibility of effecting a lubrication of the respective vibrator consists in the provision of a certain chamber receiving a certain quantity of lubricant such as oil or grease for the areas to be lubricated. This quantity is sufficient for a certain period of operation of the vibrator. Since, however, the employment of such devices varies greatly as to time, the post-lubrication, in other words, the oil and grease change of the apparatus is frequently forgotten so that, for instance, the bearing elements likewise run dry and quickly wear. In addition to the resulting repair costs, also the time during which the apparatus cannot be used is considerable and therefore represents a considerable loss.

For the above reasons, it has been suggested to fill these storage chambers with a very large quantity of oil or grease. This procedure, however, has the drawback that, for instance, with electrical devices, the current consumption increases to such an extent that the apparatus becomes too hot and consequently damage to the windings occur.

It is, therefore, an object of the present invention to provide a method and device for automatically lubricating vibrators during their operation, which will overcome the above mentioned drawbacks and will assure a constant film of lubricant during the operation of the vibrator at the areas to be lubricated.

This object and other objects and advantages of the invention will appear more clearly from the following specification in connection with the accompanying drawings, in which:

FIG. 1 diagrammatically illustrates in section a first embodiment of a lubricating system according to the present invention.

FIG. 2 diagrammatically illustrates a further embodiment of a lubricating system according to the invention in which a reciprocable element actuated by the oscillating movement of the vibrator controls the lubrication.

FIG. 3 diagrammatically shows a further embodiment of the present invention, which differs from that of FIG. 2 primarily in that the passage through which the lubricant is conveyed to the areas to be lubricated is controlled by a ball.

The present invention is characterized primarily in that a lubricant is conveyed from a lubricant storage chamber by the oscillating working movement of the vibrator to the area to be lubricated. As connection between the lubricating storage chamber and the area to be lubricated, a capillary may be provided.

According to one embodiment of the present invention, the vibrator may be equipped with a pump which, activated by the oscillating movement of the vibrator, pumps a lubricant from a lubricant storage chamber to the area to be lubricated. As pump may be used, for instance, an oscillating diaphragm which, by means of valves and conduits communicates with the lubricant supply chamber and the area to be lubricated.

According to a further embodiment of the invention, a reciprocable piston may be used as lubricating pump, the stroke movement of which may be adjusted at will.

According to a further modification of the present invention, an oil conveying passage closed for instance by a ball, cylinder or the like is controlled by the vibrating movement of the vibrator against the thrust of a spring. The lubricant supply chamber may be separated from, or may be arranged within, the vibrator and may be located for instance in the closure cap of inner vibrators.

The foremost advantage of the arrangement according to the present invention is seen primarily in that during the operation of the vibrator, the areas to be lubricated are continuously supplied with lubricant. The lubricant supply or storage chamber may be so dimensioned that a post-filling of the lubricant is necessary only after some hundred hours of operation. In view of the continuously fed lubricant, a running dry, for instance, of the bearing element will not be possible so that the life of the vibrator will be considerably increased.

Also the repair costs and idling times of such devices are considerably reduced. Furthermore, damages as they may be caused by the introduction of excessive quantities of lubricants, which damages may manifest itself for instance in an increased current supply of the device and excessive heating of the windings, will be eliminated.

Figure 1:
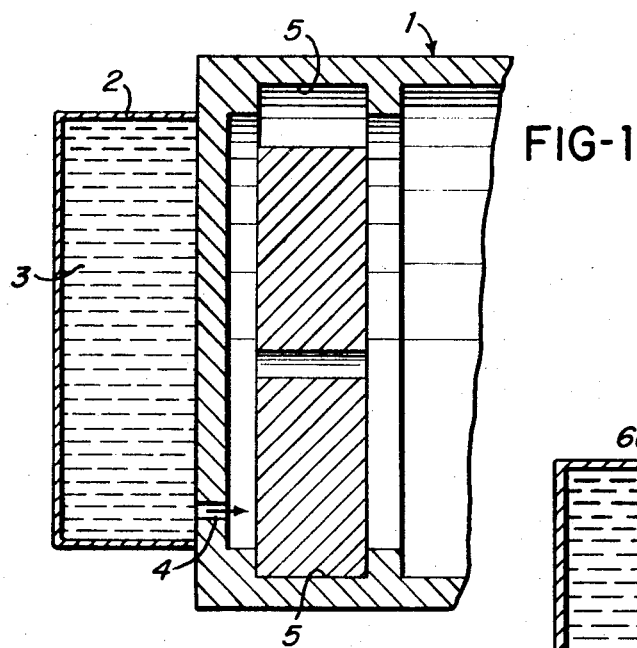

Referring now to the drawings in detail, FIG. 1 shows a device according to the present invention according to which a vibration generator 1 is provided with a lubricant storage chamber 2 adapted to be filled with a lubricant 3. In view of the working operation of the vibrator 1, the lubricant 3 passes through an opening 4, which may consist for instance of a capillary, to the areas 5 to be lubricated. These areas 5 may represent for instance bearing elements or sliding paths for rolling off unbalances.

Figure 2:
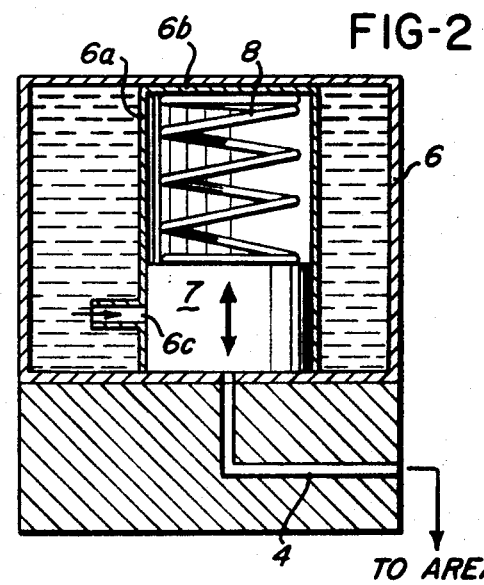

According to the embodiment illustrated in FIG. 2, the lubricant storage chamber 6 has arranged therein a housing 6a in which is reciprocably arranged a cylindrical body 7 which, through the intervention of a spring element 8, rests against the lid 6b of said housing 6a. In view of the oscillating movement of the vibrator 1, the cylindrical body 7 slides back and forth in housing 6a against the thrust of spring 8. As a result thereof, an opening 6c is periodically freed so that a lubricant from chamber 6 can pass into the cylindrical housing 6a and from there through a passage 4 to the area to be lubricated.

Figure 3:
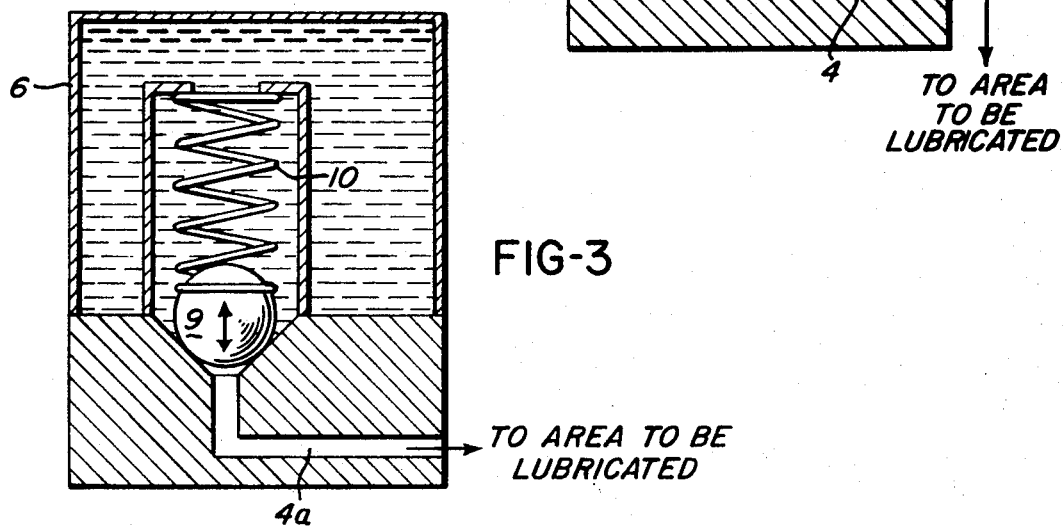

FIG. 3 shows an arrangement which is similar to that of FIG. 2 but in which the passage 4a is controlled by a ball 9 against the thrust of spring 10.

Figure 4:
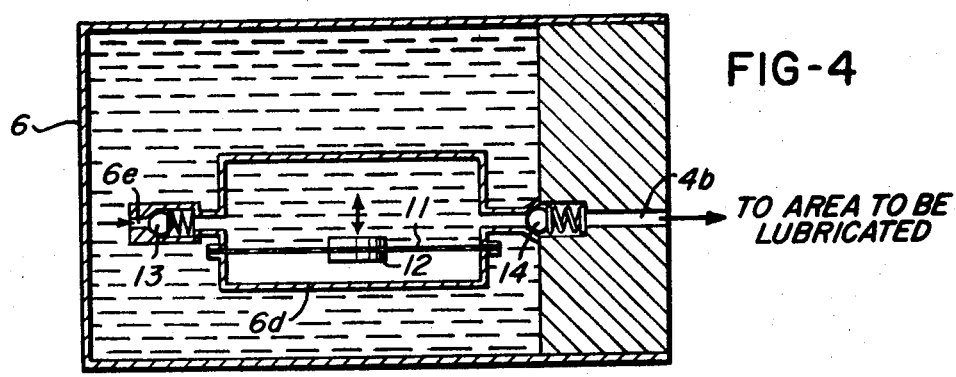
FIG. 4 represents still another embodiment of a lubricating system according to the invention, in which a diaphragm acts as lubricating pump.

Referring now to the arrangement of FIG. 4, this arrangement comprises a housing 6d arranged within the lubricant supply chamber 6. Housing 6d comprises a diaphragm 11 which may be provided with additional weights 12. In view of the oscillating movement of the vibration generator 1, the diaphragm 11 carries out a pumping movement so that the lubricant which enters the upper portion of housing 6d through the opening 6e is pumped through a passage 4b to the areas to be lubricated. The opening 6e may be provided with a check valve 13 and the passage 4b may be provided with a check valve 14 so that the oil can flow only in one direction, namely from the storage chamber 6 into the upper portion of housing 6d and from the latter through the area to be lubricated, and not vice versa.

Figure 5:
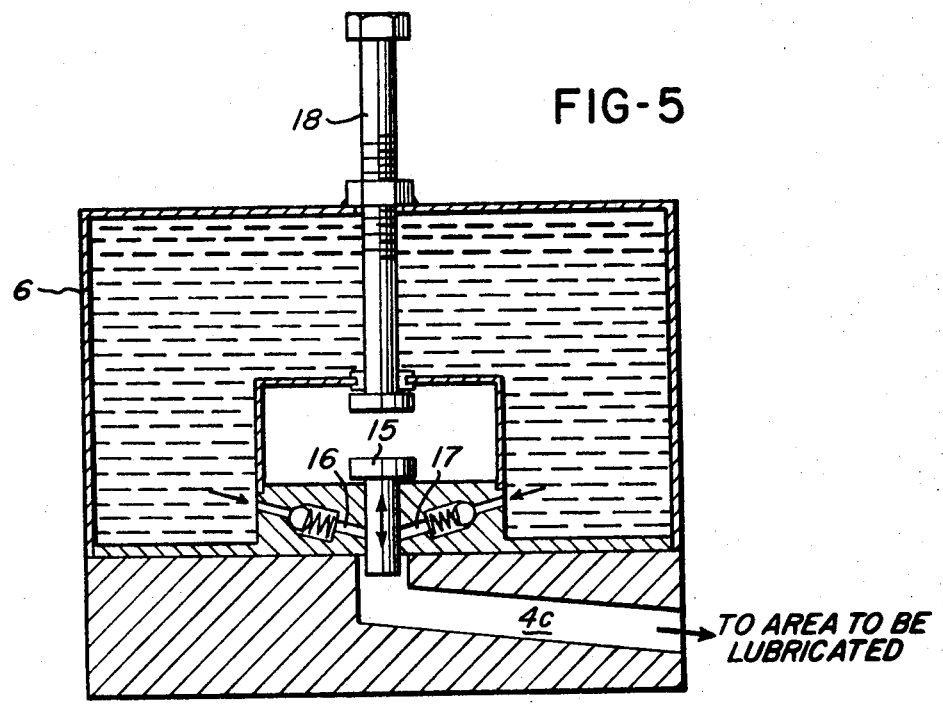
FIG. 5 represents a still further embodiment of the present invention, in which the lubrication is controlled by a reciprocable piston.

The device according to FIG. 5 differs from the arrangements of FIGS. 1 to 4 in that the lubricant feeding control is effected by a reciprocable piston 15. More specifically, in view of the vibrating action of the vibrator, the piston 15 is subjected to a reciprocatory movement as a result of which periodically bores 16 and 17 are relieved so that lubricant from the storage chamber 6 enters the bores 16 and 17 and from there passes through the connection 4c to the area to be lubricated. The stroke movement of piston 15 may be controlled by a device 18 which can be screwed more or less toward and away from the piston 15. Similar to the arrangement of FIG. 4, the bores 16 and 17 may be equipped with valves which permit the flow of lubricant from the chamber 6 into the bores 16 and 17, but not in the reverse direction.

Figure 6:
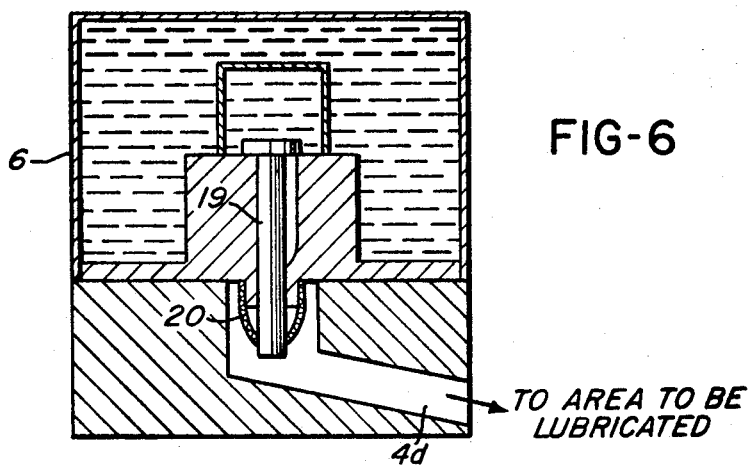
FIG. 6 shows a further modification of a lubricating system according to the invention, in which the lubricant adhering by adhesion to a piston is stripped off for instance by a sealing sleeve.

FIG. 6 shows a further embodiment of the present invention according to which the lubricant which adheres to the piston 19 by adhesion is stripped off for instance by a sealing sleeve 20 and thus through the connection 4d passes to the area to be lubricated.

It may be mentioned that the lubricant supply chamber 2,6 may be arranged in the vibrator, for instance, in the closure cap of an inner vibrator or additionally on the outside of the vibrator.

Figure 7:
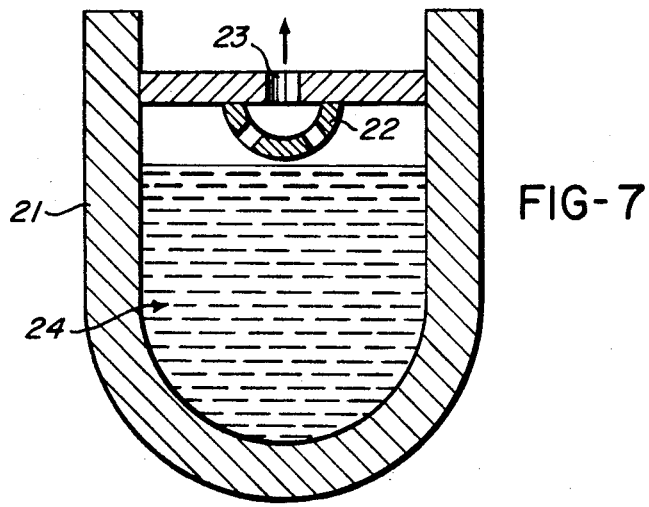
FIG. 7 shows an embodiment in which the lubricant supply chamber is arranged in the closure cap of an inner vibrator.

Such an arrangement is shown, for instance, in FIG. 7, according to which the lubricant supply chamber 24 is arranged in the closure cap 21 of an inner vibrator. A connection 23 is centrally located in the closure cap 21 and preferably may be designed in the form of a nozzle. A swell rejector 22 may be provided in the lubricant supply chamber 24 preferably around the connection 23. According to this embodiment, the lubrication is effected by an oil mist inasmuch as due to the operation of the vibrator and simultaneously due to the heating up of the lubricant in the hollow space occurring in the lubricant supply chamber 24, the oil will be atomized and in this form will pass through the connection 23. In order to prevent an oil swell from passing into and through the connection 23, there is provided a so-called "swell rejector" 22.

It is, of course, to be understood that the present invention is, by no means, limited to the particular constructions and embodiments shown in the drawings but also comprises any modifications within the scope of the appended claims.

We claim:

1. For use with unbalance means, in combination with an inner vibrator having a vibrating element movable along bearing surfaces to be lubricated with atomized oil mist, a device connectable to the inner vibrator to be lubricated, and comprising a closure cap forming a pouch lubricant storage vessel adapted to receive and store lubricant from a top portion thereof, and means in the top portion of said closure cap responsive to the vibration of said inner vibrator for conveying lubricant continually maintained in readiness from said storage vessel to the area of said bearing surfaces to be lubricated, said lubricant being spaced from said portion to allow air above said lubricant, said means in the top portion of said closure cap including capillary nozzle means establishing communication between said lubricant storage vessel and the area of unbalance means to be lubricated of said inner vibrator, and a swell rejector positioned before and about said nozzle means and above said lubricant and having small apertures to prevent any lubricant swell from passing through said nozzle means and allowing only for passage of atomized oil mist.

* * * * *